US012583011B2

(12) United States Patent
    Petrovic

(10) Patent No.:    US 12,583,011 B2
(45) Date of Patent:        Mar. 24, 2026

(54) DRIVE MECHANISM AND VISCOUS MATERIAL DISPENSING GUN

(71) Applicant: Miro Petrovic, Richmond (CA)

(72) Inventor: Miro Petrovic, Richmond (CA)

( * ) Notice: Subject to any disclaimer, the term of this patent is extended or adjusted under 35 U.S.C. 154(b) by 344 days.

(21) Appl. No.: 18/565,485

(22) PCT Filed: Jun. 11, 2021

(86) PCT No.: PCT/CA2021/050803
    § 371 (c)(1),
    (2) Date: Nov. 29, 2023

(87) PCT Pub. No.: WO2022/256906
    PCT Pub. Date: Dec. 15, 2022

(65) Prior Publication Data
    US 2024/0253078 A1      Aug. 1, 2024

(51) Int. Cl.
    *B05C 17/01*        (2006.01)
    *F16H 19/04*        (2006.01)
    *F16H 37/12*        (2006.01)
(52) U.S. Cl.
    CPC .......... *B05C 17/0116* (2013.01); *F16H 19/04* (2013.01); *F16H 37/124* (2013.01)
(58) Field of Classification Search
    CPC ............ B05C 17/0103; B05C 17/0133; B05C 17/00553; B05C 17/0116; F16H 19/04; F16H 37/124
    USPC ................ 222/333, 390, 327, 326, 137, 386
    See application file for complete search history.

(56) References Cited

U.S. PATENT DOCUMENTS

| | | | | |
|---|---|---|---|---|
| 3,635,378 | A | | 1/1972 | Dehart |
| 4,583,934 | A | * | 4/1986 | Hata ................... B05C 17/0103 222/386 |
| 4,615,469 | A | * | 10/1986 | Kishi ................. B05C 17/0103 222/327 |
| 4,669,636 | A | * | 6/1987 | Miyata ............... B05C 17/0103 222/391 |
| 5,188,259 | A | * | 2/1993 | Petit ................... B05C 17/0103 222/326 |
| 5,503,307 | A | * | 4/1996 | Wilson ............... B05C 17/0106 222/326 |

(Continued)

FOREIGN PATENT DOCUMENTS

| | | |
|---|---|---|
| CN | 103213108 B | 4/2015 |
| EP | 1609535 A2 | 12/2005 |

OTHER PUBLICATIONS

Extended European Search Report for corrersponding European Application No. 21944431.2, mailed Feb. 20, 2025, 5 pages.

(Continued)

*Primary Examiner* — Charles P. Cheyney
(74) *Attorney, Agent, or Firm* — Quarles & Brady, LLP

(57) ABSTRACT

A compact drive mechanism for converting rotary motion to linear motion comprising a casing, gearbox, and beam coupled to the casing and gearbox, wherein the gearbox advances along the casing and the beam extends out from the casing simultaneously in response to rotary input to the gearbox. In its preferred embodiment, the invention comprises the drive mechanism incorporated into a handheld viscous material dispenser, wherein the beam further comprises a plunger face which acts on a viscous material cartridge, such as a caulk cartridge, to eject the viscous material from the cartridge.

20 Claims, 15 Drawing Sheets

200

(56) References Cited

U.S. PATENT DOCUMENTS

| | | | | |
|---|---|---|---|---|
| 6,626,058 | B2 | 9/2003 | Ueda | |
| 8,141,754 | B2 * | 3/2012 | Conner | B05B 9/0861 |
| | | | | 439/500 |
| 9,415,408 | B2 | 8/2016 | Schultheiss | |
| 9,731,258 | B2 | 8/2017 | Janssen | |
| 2002/0130141 | A1 * | 9/2002 | Gardos | B05C 17/0103 |
| | | | | 222/144 |
| 2007/0164048 | A1 * | 7/2007 | Lou | B65D 83/761 |
| | | | | 222/137 |
| 2007/0251957 | A1 * | 11/2007 | Chen | G01F 13/00 |
| | | | | 222/386 |
| 2009/0224006 | A1 * | 9/2009 | Post | B05C 17/0113 |
| | | | | 222/391 |
| 2010/0320234 | A1 * | 12/2010 | Punchenko | B05C 17/0103 |
| | | | | 222/196 |
| 2013/0115568 | A1 * | 5/2013 | Jelovac | A61C 9/0026 |
| | | | | 433/36 |
| 2014/0301153 | A1 | 10/2014 | Buck et al. | |
| 2016/0270994 | A1 | 9/2016 | Staudinger | |
| 2023/0047352 | A1 * | 2/2023 | Li | B05C 17/00556 |

OTHER PUBLICATIONS

International Search Report and Written Opinion issued in corresponding PCT Application No. PCT/CA2021/050803, mailed Feb. 22, 2022.

* cited by examiner

100

100

DRIVE MECHANISM AND VISCOUS MATERIAL DISPENSING GUN

CROSS REFERENCE TO RELATED APPLICATION

This application represents the U.S. national stage entry of International Application No. PCT/CA2021/050803 filed Jun. 11, 2021, the disclosure of which is hereby incorporated by reference in its entirety for all purposes.

FIELD OF THE INVENTION

This invention relates to drive mechanisms for converting rotary motion to linear motion. In particular, this invention relates to linear actuators adapted for dispensing viscous materials.

BACKGROUND OF THE INVENTION

Viscous material dispensing guns all share similar operational and functional design challenges in that they must accommodate the varying viscosities of the many available materials used, the properties of the materials being dispensed at ambient temperatures, and ergonomic considerations including available work-space and equipment weight. Available work-space is a particular challenge, as the known viscous material dispensing guns predominantly use a one-piece plunger ram that acts on the bottom of the viscous material cartridge. In order to fully dispense the viscous material, the plunger is required to travel through substantially the entire length of the viscous material cartridge. This requires a plunger that is at least as long as the viscous material cartridge, meaning that the overall viscous-material dispensing gun is at least twice as long as the viscous 20) material cartridge. The overall length of the viscous material dispensing gun renders operating the gun in confined areas awkward, if not outright impossible.

Typical manually-operated viscous material dispensers use a grip-operated trigger to advance the plunger into the viscous material cartridge on a rod. Dispensing quality beads of viscous material using a manual dispenser requires 25 the operator to exert a steady, even pressure on the trigger while simultaneously moving the dispensing gun at a measured rate. The operation relies on the experience, skill and physical attributes of the operator conducting the work. As operator fatigue increases when using typical viscous material dispensing guns, the quality of work will decrease as a result.

Automatic dispensing guns are known in the art and can reduce certain of the drawbacks of a manual gun by using a drive mechanism to advance the plunger. However, in the known automatic dispensing guns, the plunger is advanced on a rack gear or threaded rod. As discussed above, such rack gears or threaded rods are required to be quite long. To ensure the drive mechanism functions properly, relatively high machining tolerances must be held along the entire length of these components. This drives up the cost of the components and the dispensing gun overall.

It is therefore an object of this invention to provide a viscous material dispensing gun having a significantly shorter plunger length to facilitate ergonomics in confined spaces.

It is a further object of the invention to provide an automatic dispensing gun with a shorter plunger ram and commensurately lower component costs.

These and other objects will be better understood by reference to this application as a whole. Not all of the objects are necessarily met by all embodiments of the invention described below or by the invention defined by each of the claims.

SUMMARY OF THE INVENTION

In one aspect, the invention comprises a device for converting rotary motion to linear motion with a moveable gearbox, usually referred to as a linear actuator. The linear actuator comprises a casing and first rack gear. A beam is coupled to the casing for extendible translation relative to the casing and preferably further comprises a second rack gear. A gearbox is slidably coupled to the casing to translate along a longitudinal axis of the casing. The gearbox comprises a carriage, a driven gear train mounted in the carriage, and a driver gear assembly, which preferably comprises a drive shaft and a worm, coupled to the carriage. The driven gear train preferably comprises a first and second shaft, with a worm gear and first pinion gear arranged on the first shaft, and a first spur gear and second pinion gear arranged on the second shaft. The worm gear meshes with the worm, the first pinion gear meshes with the first rack gear and first spur gear, and the second pinion gear meshes with the second rack gear. A rotary drive source, preferably an external source such as an electric screwdriver that has been coupled to the drive shaft, applies rotation to the driver gear assembly, which is converted through the gearbox assembly into simultaneous translatory movement of the gearbox within the casing along the first rack gear and translatory movement of the beam relative to the gearbox. The total distance extended by the beam is the sum of the two respective translations.

In another preferred aspect, the invention comprises a linear actuator as described incorporated in a viscous material dispenser adapted to dispense a viscous material from a standard viscous material cartridge, particularly as an improvement over caulking guns known in the art. The viscous material dispenser comprises a viscous material chamber and a drive mechanism section incorporating the linear actuator. A plunger face is attached to a first end of the beam to form a plunger ram, which acts to force the viscous material from the viscous material cartridge as the plunger ram extends. The driver gear assembly is preferably pivotably coupled to the carriage so that the worm can be selectively disengaged from the worm gear, which both facilitates rapid retraction of the plunger ram for reloading of the viscous material dispenser and to quickly release the pressure applied by the plunger face to prevent leakage of the viscous material after dispensing is completed.

Because both the gearbox and the plunger face advance, the plunger ram can be made shorter than in other viscous material dispensers known in the art while still allowing all of the viscous material contained in the viscous material cartridge to be dispensed.

The viscous material chamber is preferably pivotably connected to the drive mechanism section, allowing the viscous material chamber to be swung away from the drive mechanism section to facilitate insertion and ejection of the viscous material cartridge. To prevent the viscous material chamber from inadvertently separating from the drive mechanism section during dispensing, the viscous material dispenser preferably further comprises a spring-loaded locking hook pivotably connected to the viscous material chamber that engages with a retaining groove on the drive mechanism section. The locking hook and retaining groove preferably have a circular arc profile and the locking hook preferably has a negative rake, all of which contributes to a more rigid, separation-resistant connection between the viscous material chamber and the drive mechanism section.

In another aspect, the viscous material chamber of the viscous material dispenser further comprises a reservoir for containing a bulk viscous material or fluid. A dispenser port of the viscous material chamber comprises a sealing valve to prevent leakage of the fluid. The plunger face further comprises peripheral sealing elements that engage with an interior wall of the reservoir to prevent the fluid from flowing past the plunger face and fouling the linear actuator.

In another aspect, the invention comprises a drive mechanism comprising an elongate casing, a gearbox assembly retained by the elongate casing for traversing motion along a longitudinal axis of the elongate casing, the gearbox assembly comprising a carriage, a driven gear train mounted to the carriage, a driver gear connected to the carriage and meshing with the driven gear train, and an extendable beam retained by the elongate casing, the extendable beam comprising a beam rack gear meshing with the driven gear train, wherein rotation of the driver gear simultaneously causes the gearbox assembly to traverse the elongate casing and the extendable beam to extend.

In a further aspect, the elongate beam may comprise a plunger for imparting motion to a viscous fluid.

In another further aspect, the elongate casing may comprise a casing rack gear substantially aligned with the longitudinal axis, the driven gear train also meshing with the casing rack gear.

In another aspect, the invention comprises a viscous material dispenser comprising a viscous material chamber, a drive mechanism comprising an elongate casing, a gearbox assembly retained by the elongate casing for traversing motion along a longitudinal axis of the elongate casing, the gearbox assembly comprising a carriage, a driven gear train mounted to the carriage, a driver gear connected to the carriage and meshing with the driven gear train, and an extendable plunger ram retained by the elongate casing, the plunger ram comprising a beam rack gear meshing with the driven gear train, and a plunger face mounted to a first end of the plunger ram, wherein rotation of the driver gear simultaneously causes the gearbox assembly to traverse the elongate casing and the plunger ram to extend into the viscous material chamber.

In a further aspect, the driver gear is a worm. The worm may be mounted on a drive shaft. The drive shaft may be pivotably connected to the carriage so that the worm pivots into and out of engagement with the driven gear train.

In another further aspect, the viscous material dispenser may comprise a rotary drive source coupled to the driver gear. The rotary drive source may be an electric screwdriver.

In another further aspect, the casing may comprise a casing rack gear, the casing rack gear meshing with the driven gear train. The driven gear train may comprise a worm gear meshing with the worm, a first pinion gear meshing with the casing rack gear, a second pinion gear meshing with the second rack gear, and at least one reducer gear interposed between the first pinion gear and the second pinion gear.

In another further aspect, the viscous material chamber may comprise a cavity adapted to receive a standard viscous material cartridge. The plunger face may act upon an end seal of the viscous material cartridge.

In another further aspect, the viscous material chamber is pivotably connected to the drive mechanism section so as to allow the viscous material chamber to pivot between an open position away from the drive mechanism section for introduction of the viscous material into the viscous material chamber and a closed position wherein the plunger ram is aligned for extension into the viscous material chamber. The viscous material dispenser may further comprise a locking mechanism for maintaining the viscous material chamber in the closed position. The locking mechanism may comprise a locking lever pivotably connected to the viscous material chamber and a retaining groove recessed in the drive mechanism section, the locking lever comprising a locking hook adapted to engage with the retaining groove and an opposing push tab for selectively pivoting the locking lever such that the locking hook disengages from the retaining groove. The push tab may be spring loaded to cause the locking hook to automatically engage with the retaining groove when the viscous material chamber is moved to the closed position. A base of the engagement groove and a tip of the locking hook may be mutually arcuate.

In another aspect, a method for dispensing a viscous material comprises providing a viscous material dispenser comprising a viscous material chamber, the viscous material chamber comprising a dispenser port, a drive mechanism comprising an elongate casing, a gearbox assembly retained by the elongate casing for traversing motion along a longitudinal axis of the elongate casing, the gearbox assembly comprising a carriage, a driven gear train mounted to the carriage, a driver gear connected to the carriage and meshing with the driven gear train, and an extendable plunger ram retained by the elongate casing, the plunger ram comprising a beam rack gear meshing with the driven gear train, and a plunger face mounted to a first end of the plunger ram, wherein rotation of the driver gear simultaneously causes the gearbox assembly to traverse the elongate casing and the plunger ram to extend into the viscous material chamber, introducing a viscous material into the viscous material chamber, and rotating the driver gear, thereby ejecting the viscous material through the dispenser port.

In a further aspect, the step of introducing a viscous material into the viscous material chamber may comprise rotating the driver gear in a reverse direction to retract the plunger ram from the viscous material chamber and delivering the viscous material into the viscous material chamber.

In another further aspect the driver gear may be pivotably connected to the carriage. The method may further comprise interrupting ejection of the viscous material by pivoting the driver gear to disengage the driver gear from the driven gear train. The step of introducing a viscous material into the viscous material chamber may comprise pivoting the driver gear to disengage the driver gear from the driven gear train, pulling the gearbox assembly back to retract the plunger ram from the viscous material chamber, and delivering the viscous material into the viscous material chamber.

In a still further aspect, the step of delivering the viscous material into the viscous material chamber may comprise inserting a standard viscous material cartridge into the viscous material chamber. The viscous material chamber may be pivotably connected to the drive mechanism. The step of inserting a standard viscous material cartridge into the viscous material chamber may comprise pivoting the viscous material chamber away from the drive and inserting the standard viscous material cartridge into an open end of the viscous material chamber.

In another aspect, a method for dispensing a viscous material comprises providing a viscous material dispenser comprising a dispenser body comprising a viscous material chamber adapted to retain a viscous fluid cartridge containing the viscous material to be dispensed, and an elongate casing comprising a first rack gear, the first rack gear substantially aligned with a longitudinal axis of the cartridge when the viscous fluid cartridge is retained in the viscous material chamber, a gearbox assembly adapted to traverse longitudinally along the elongate casing, the gearbox assembly comprising a carriage, and a drive train mounted to the gearbox carriage, the drive train comprising a rotational driver, a drive shaft pivotably connected to the carriage and coupled to the rotational driver, a worm mounted to the drive shaft, and a driven gear train, the driven gear train meshing with the worm and the first rack gear so that the carriage traverses the elongate casing when the worm is driven by the rotational driver, and a plunger ram comprising a plunger face, and a second rack gear, wherein the plunger face is mounted to a first end of the second rack gear, the second rack gear meshing with the driven gear train, wherein the plunger ram is adapted to extend from the gearbox housing into the viscous fluid cartridge when the driven gear train is driven by the rotational driver, thereby dispensing the viscous fluid from the viscous fluid cartridge, actuating the rotational driver, thereby extending the plunger ram to dispense the viscous material, dispensing an amount of the viscous material, pivoting the drive shaft, thereby disengaging the worm from the driven gear train, halting the plunger ram, removing a force the plunger ram applies to the viscous material, and halting the dispensing of the viscous material.

In another aspect, a drive mechanism for converting rotational motion to linear motion comprises an elongate casing, a first rack gear mounted to the elongate casing and aligned with a longitudinal axis of the elongate casing, a gearbox assembly retained within the elongate casing for reciprocating motion along the longitudinal axis of the elongate casing, the gearbox assembly comprising a carriage, a drive shaft connected to the carriage, the drive shaft adapted to be coupled to a rotary drive source, a driver gear mounted to the drive shaft, and a driven gear train mounted on the carriage and meshing with the driver gear and the first rack gear so that the gearbox assembly reciprocates along the elongate casing in response to rotational motion of the rotary drive source, and an elongate beam retained by the elongate casing for reciprocating extension and retraction relative to the elongate casing, the elongate beam comprising a second rack gear meshing with the driven gear train so that the elongate beam reciprocally extends and retracts in response to rotational motion of the rotary drive source concurrently with the reciprocating motion of the gearbox assembly.

In another aspect, a viscous material dispenser comprises a drive mechanism section comprising an elongate casing, a first rack gear mounted inside the elongate casing and aligned with a longitudinal axis of the elongate casing, a gearbox assembly retained within the elongate casing for reciprocating motion along the longitudinal axis of the elongate casing, the gearbox assembly comprising a carriage, a drive shaft connected to the carriage, the drive shaft adapted to be coupled to a rotary drive source, a driver gear mounted to the drive shaft, and a driven gear train mounted on the carriage and meshing with the worm and the first rack gear so that the gearbox assembly moves along the elongate casing in a first direction in response to clockwise rotational motion of the rotary drive source and moves along the elongate casing in a second direction in response to counterclockwise rotational motion of the rotary drive source, a plunger ram slidably retained by the elongate casing for extending motion relative to the elongate casing, the plunger ram comprising a plunger face mounted to a first end of the plunger ram, and a second rack gear meshing with the driven gear train of the gearbox assembly so that the plunger ram extends and retracts in response to alternating directions of rotational motion of the rotary drive source concurrently with the movement in the first direction and the second direction of the gearbox carriage, and viscous material chamber connected to the drive mechanism section, the viscous material section comprising a receiver port into which the plunger ram extends to act upon a viscous material, and a dispensing port through which the viscous material exits the viscous material chamber when acted upon by the plunger ram.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which.

Figure 1A:
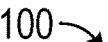
FIG. 1A is a perspective view of a drive mechanism according to a first embodiment of the invention.
Figure 1A:
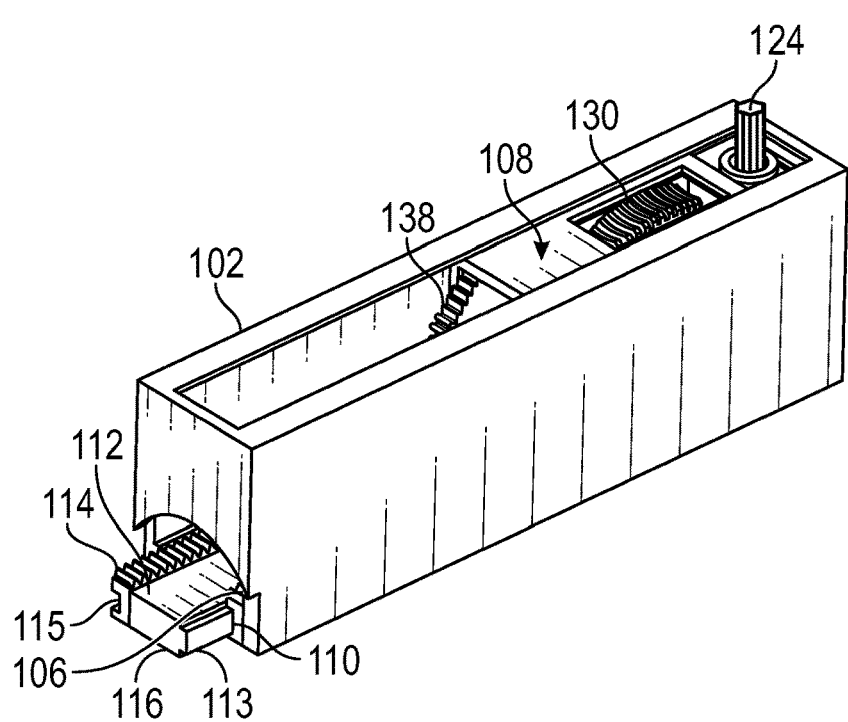
Figure 1B:
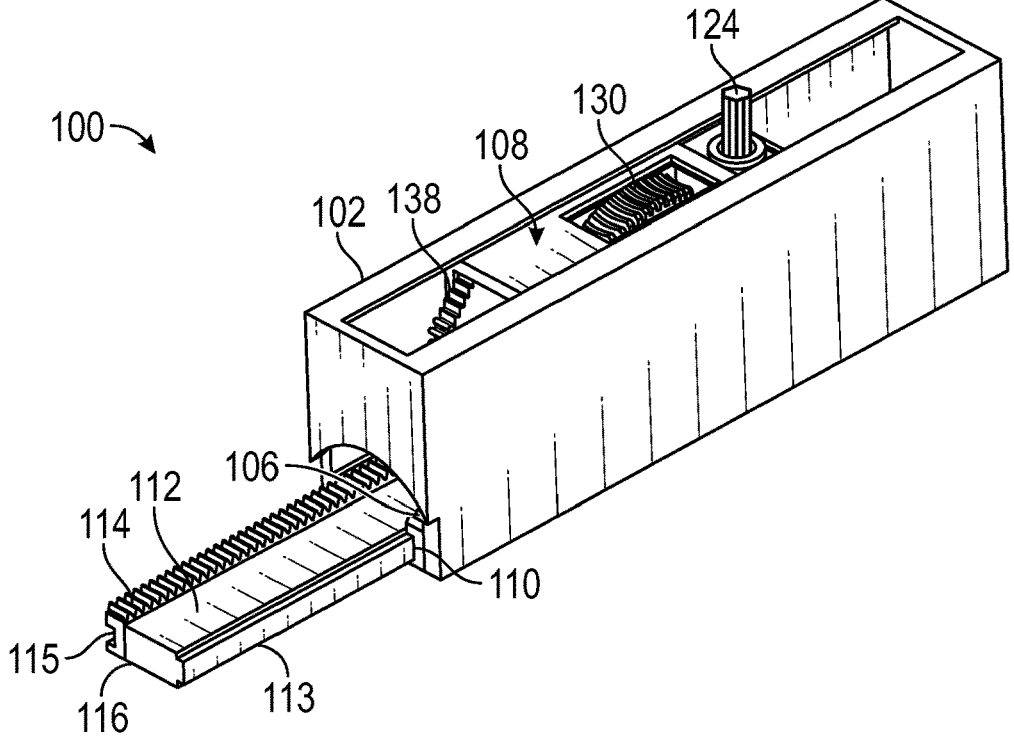
FIG. 1B is a perspective view of the drive mechanism of FIG. 1A with the beam partially extended.
Figure 2:
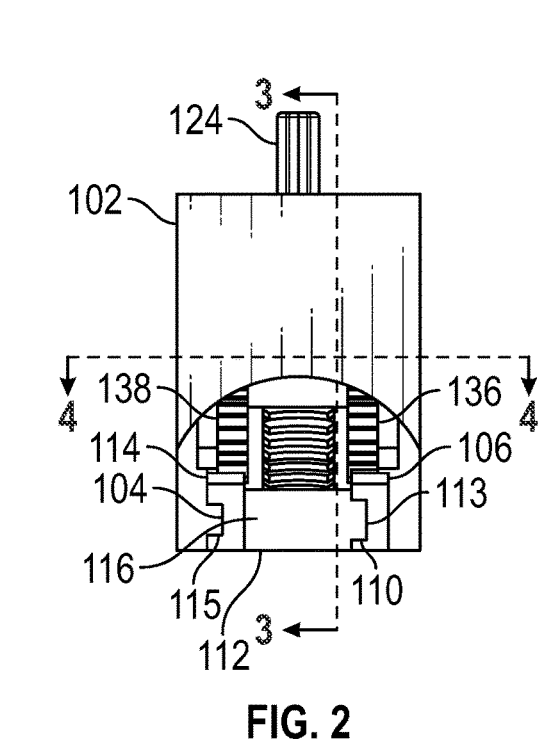
FIG. 2 is a front view of the drive mechanism of FIG. 1A.

DETAILED DESCRIPTION OF AT LEAST ONE MODE FOR CARRYING OUT THE INVENTION IN TERMS OF EXAMPLE(S)

Referring to FIGS. 1 to 4, in one embodiment of the invention a drive mechanism 100 for converting rotary motion into linear motion comprises a casing 102 and a gearbox assembly 108 retained within the casing 102. The casing 102 preferably substantially restrains the gearbox assembly 108 in all degrees of freedom of movement except translation along a longitudinal axis of the casing 102. The casing 102 further comprises a casing rack gear 106 substantially aligned with the longitudinal axis of the casing 102. A beam 112 comprising a beam rack gear 114 is slidably retained by the casing 102, preferably in a manner described in further detail below. The beam 112 is also preferably substantially restrained in all degrees of freedom of movement except for longitudinal extension outwards from the casing 102. The retention and restraint of the beam 112 by the casing 102 is preferably accomplished by the casing 102 further comprising a first tongue 104 and first groove 110 and the beam 112 further comprising a second tongue 113 and second groove 115. The first tongue 104 inserts into the second groove 115 and the second tongue 113 inserts into the first groove 110, such that the tongues can slide relative to the respective grooves but the beam 112 is otherwise prevented from rotating or shifting laterally or vertically.

The beam 112 slides longitudinally relative to the casing 102 from a first position substantially within the casing 102 to a second position substantially outside of the casing 102 as shown by FIGS. 1A and 1B, and FIGS. 6A to 6C. Various useful devices could be attached to a first end 116 of the beam 112 (that is, the end which extends outside of the casing 102) to allow the beam to perform useful work. These devices could include, as non-limiting examples, a plunger face for propelling fluids or a platform for lifting objects.

Figure 3:
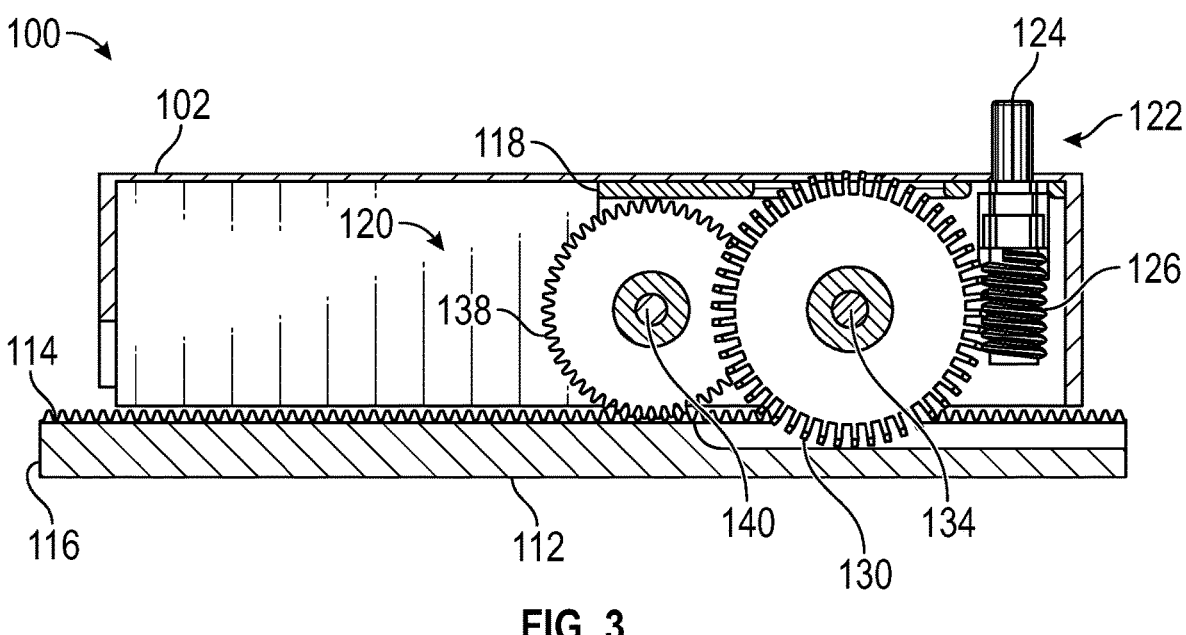
FIG. 3 is a sectioned side view of the drive mechanism of FIG. 1A, taken along line 3-3 of FIG. 2.
Figure 4:
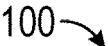
FIG. 4 is a sectioned top view of the drive mechanism of FIG. 1A, taken long line 4-4 of FIG. 2.
Figure 4:
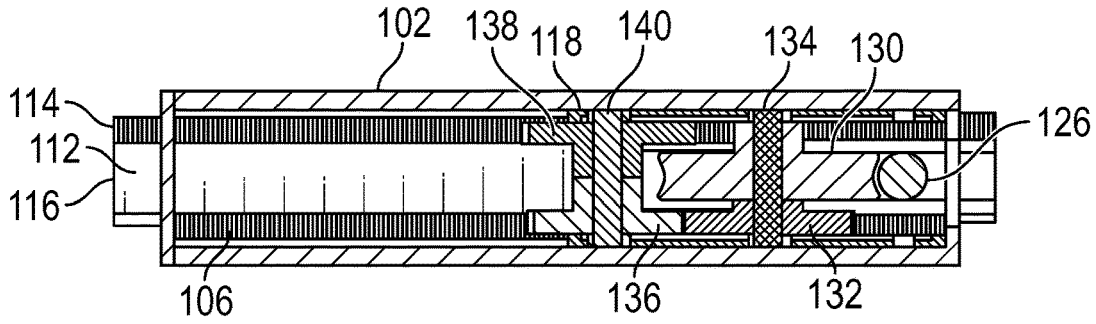
Figure 5:
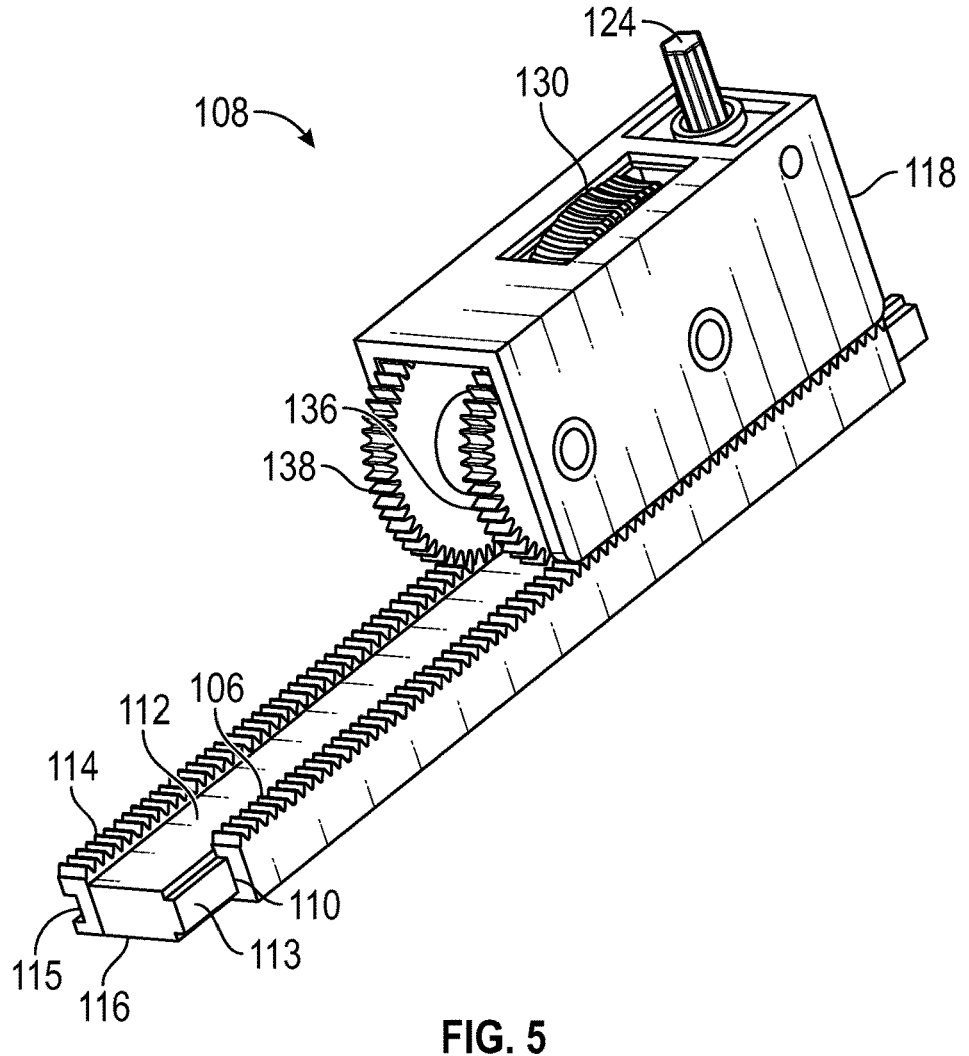
FIG. 5 is a perspective view of the drive mechanism of FIG. 1A, with the casing of the drive mechanism removed to display the gearbox carriage.
Figures 6A, 6B, 6C:
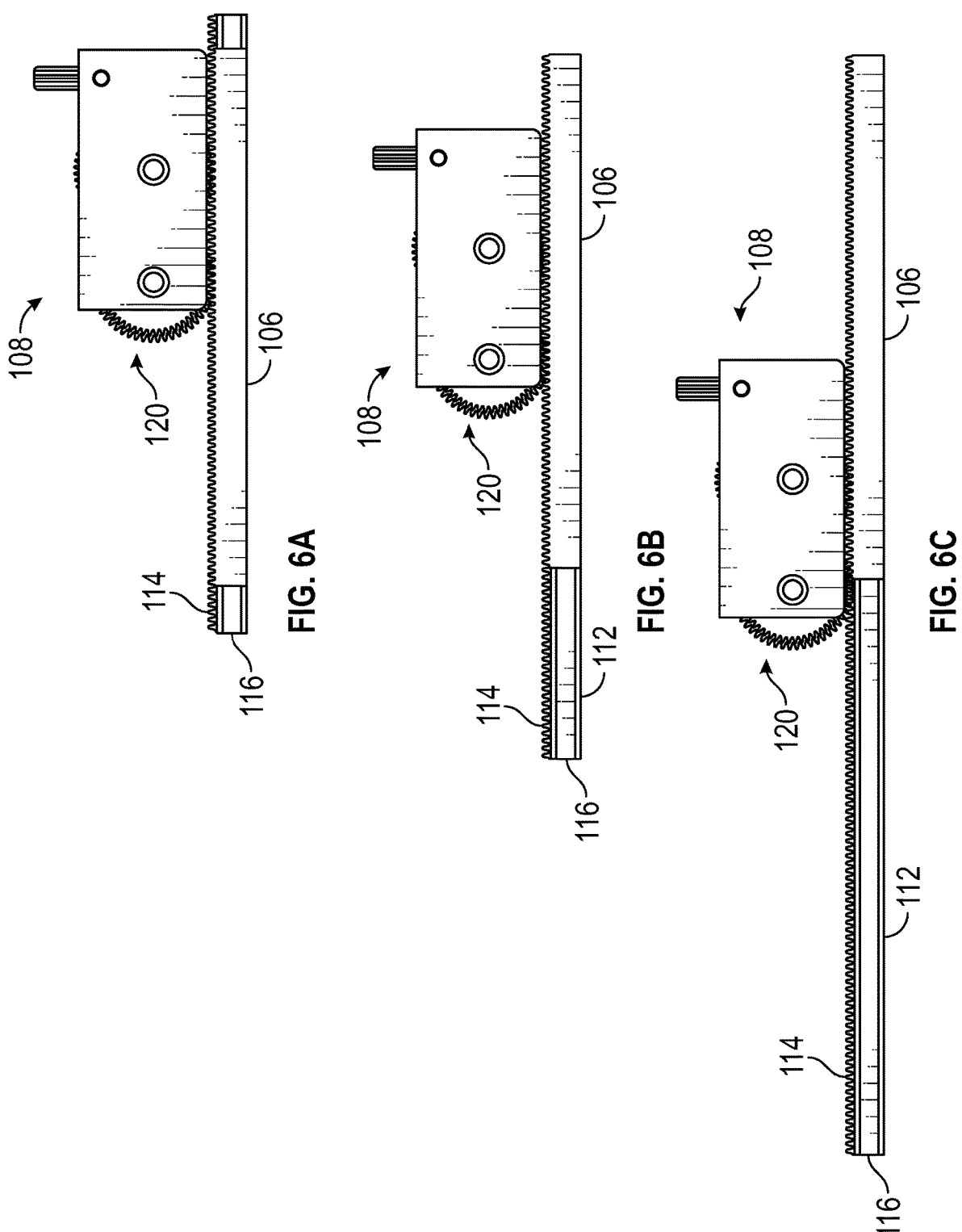
FIGS. 6A to 6C are side views of the drive mechanism of FIG. 5, showing the beam in a retracted position, partially extended position, and fully extended position, respectively.
Figure 7:
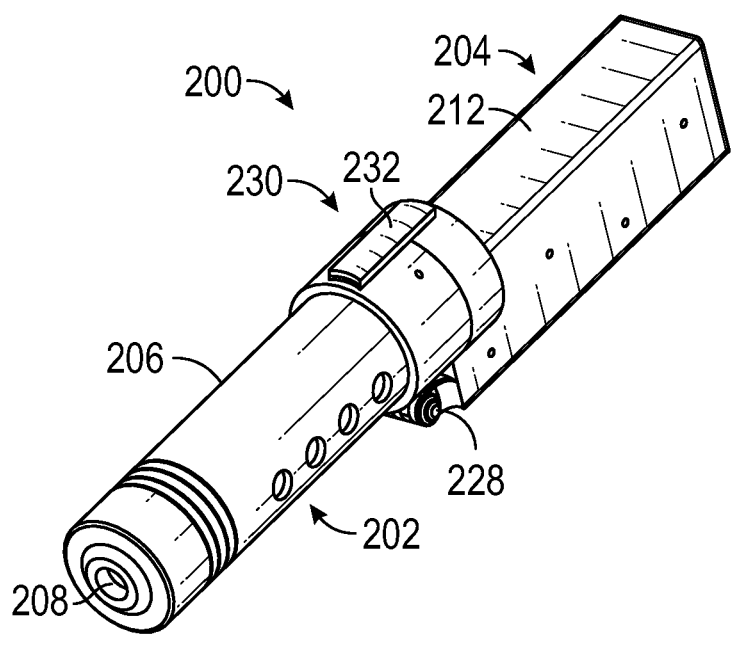
FIG. 7 is a front perspective view of a viscous material dispenser according to the preferred embodiment of the invention.
Figure 8:
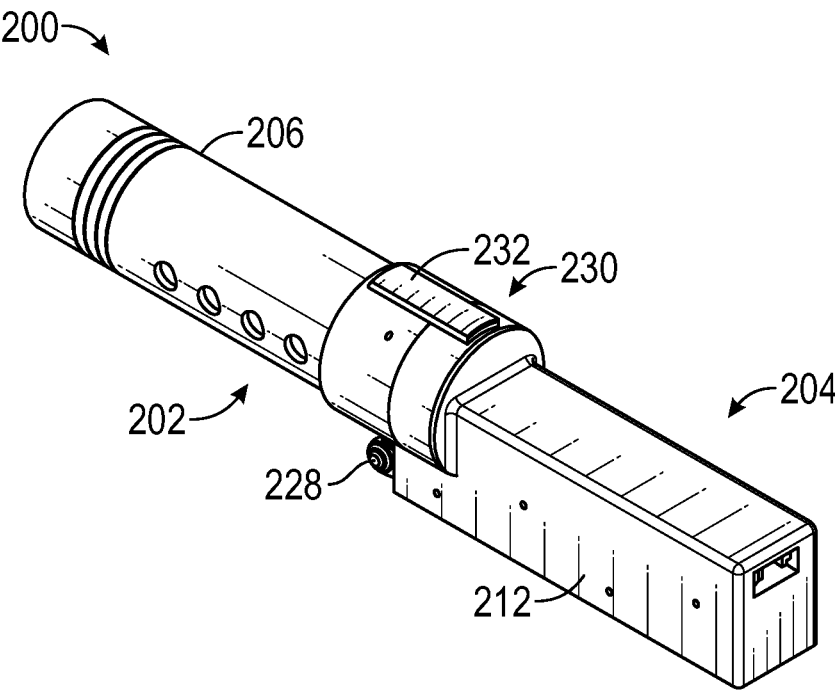
FIG. 8 is a rear perspective view of the viscous material dispenser of FIG. 7.
Figure 9:
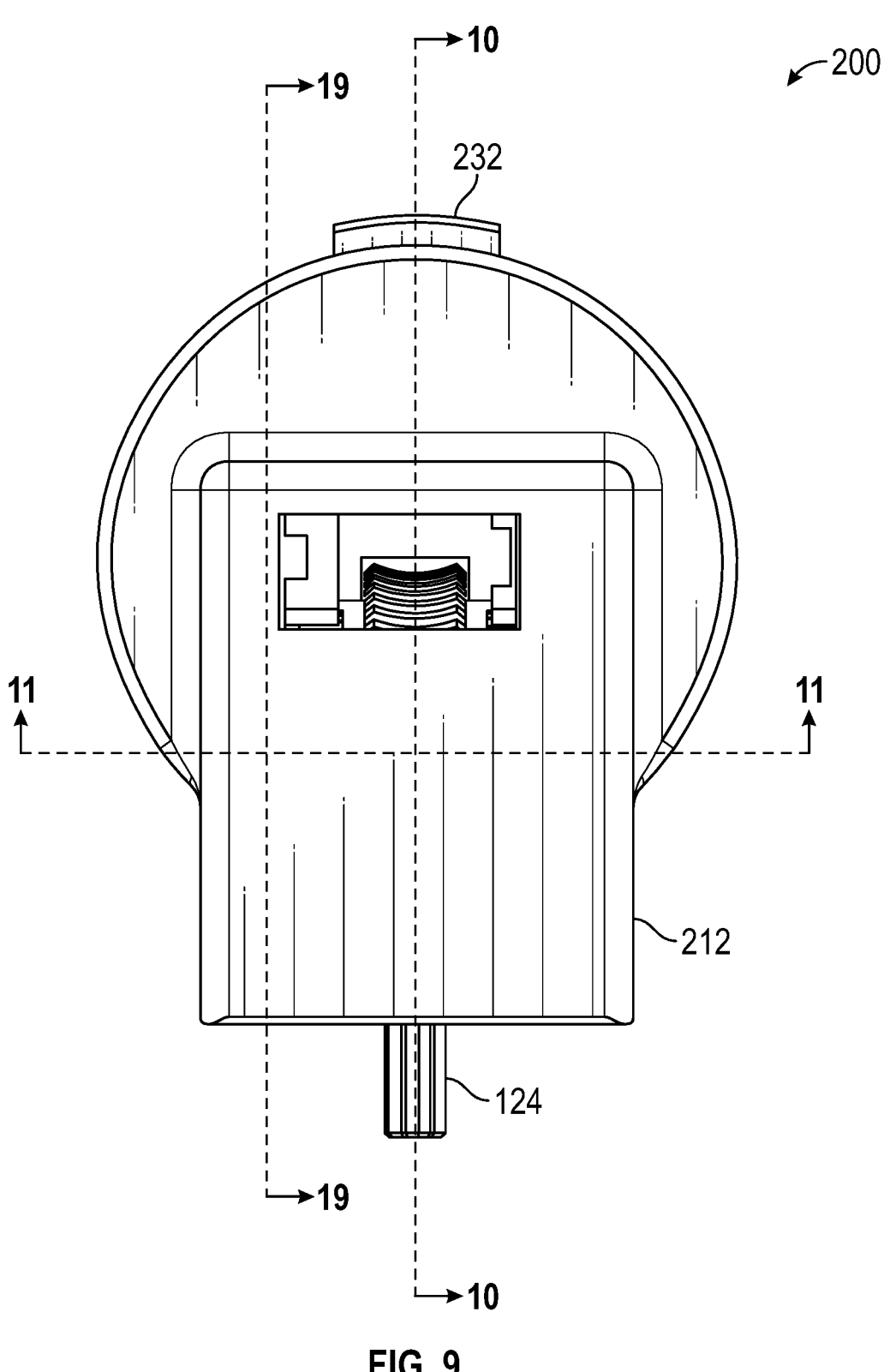
FIG. 9 is a rear view of the viscous material dispenser of FIG. 7.
Figures 10, 11:
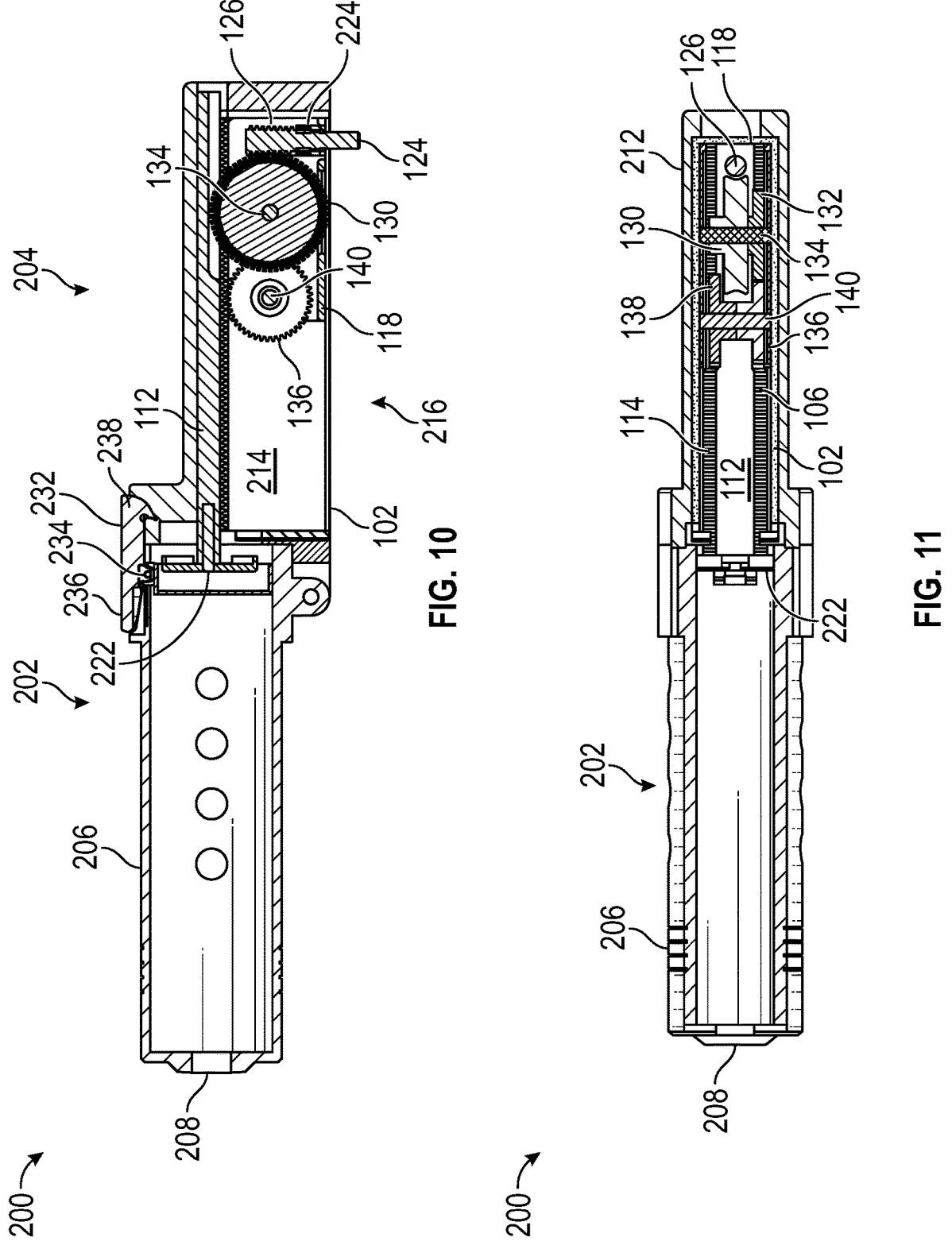
FIG. 10 is a sectioned side view of the viscous material dispenser of FIG. 7, taken along line 10-10 of FIG. 9.
FIG. 11 is a sectioned bottom view of the viscous material dispenser of FIG. 7, taken along line 11-11 of FIG. 9.
Figure 12:
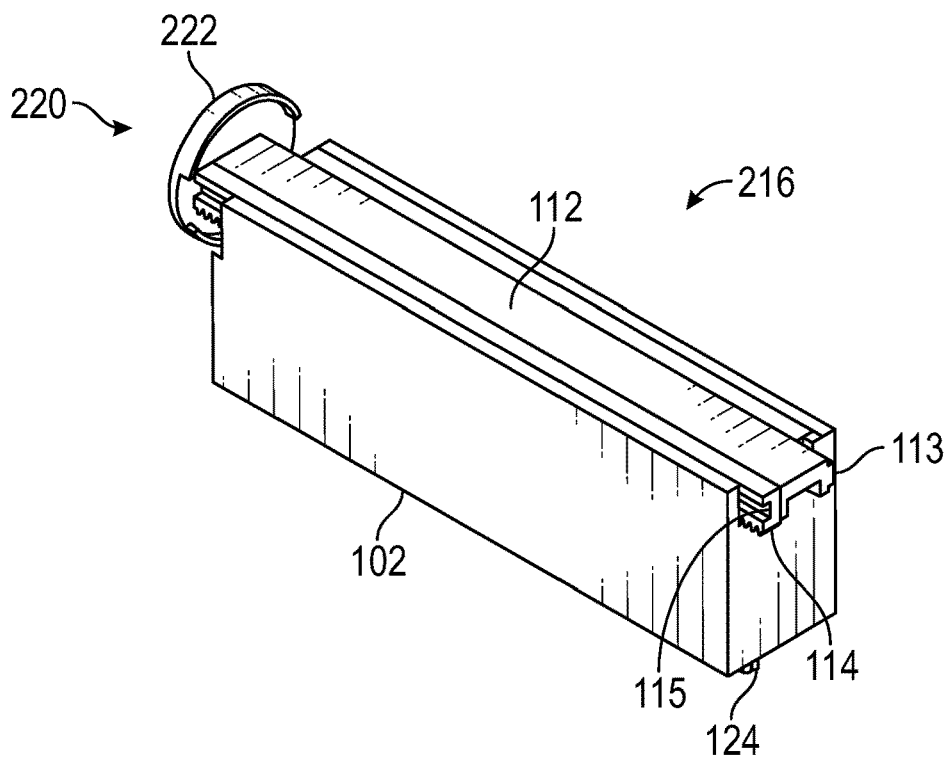
FIG. 12 is a perspective view of a drive mechanism assembly of the viscous material dispenser of FIG. 7.
Figure 13:
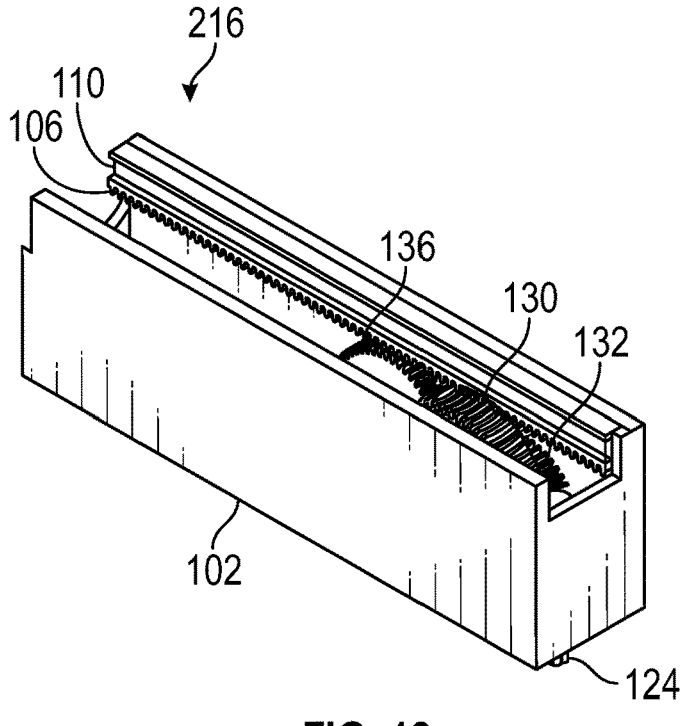
FIG. 13 is a perspective view of the drive mechanism assembly of FIG. 12 with the plunger ram removed to show the interior of the drive mechanism assembly.
Figure 14:
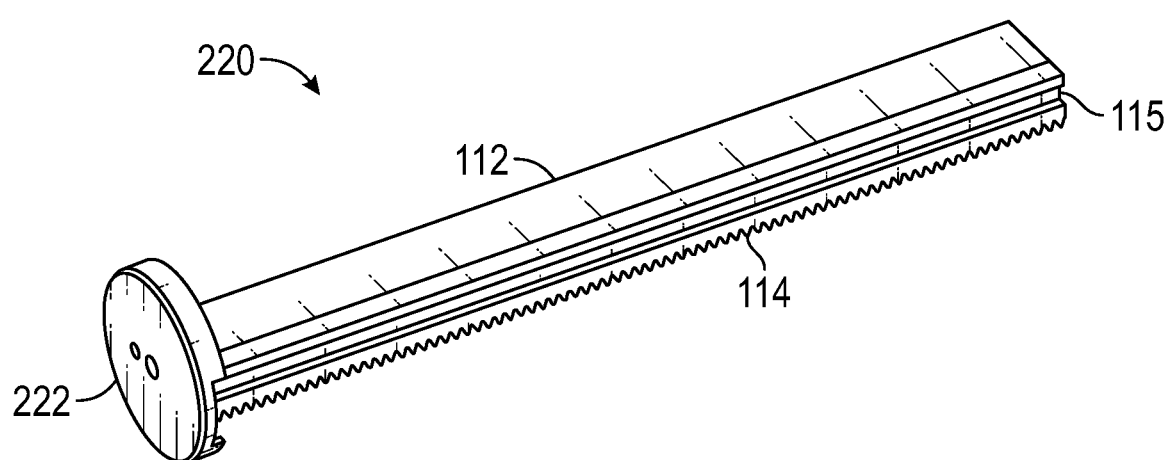
FIG. 14 is a perspective view of a plunger ram of the viscous material dispenser of FIG. 7.
Figure 15:
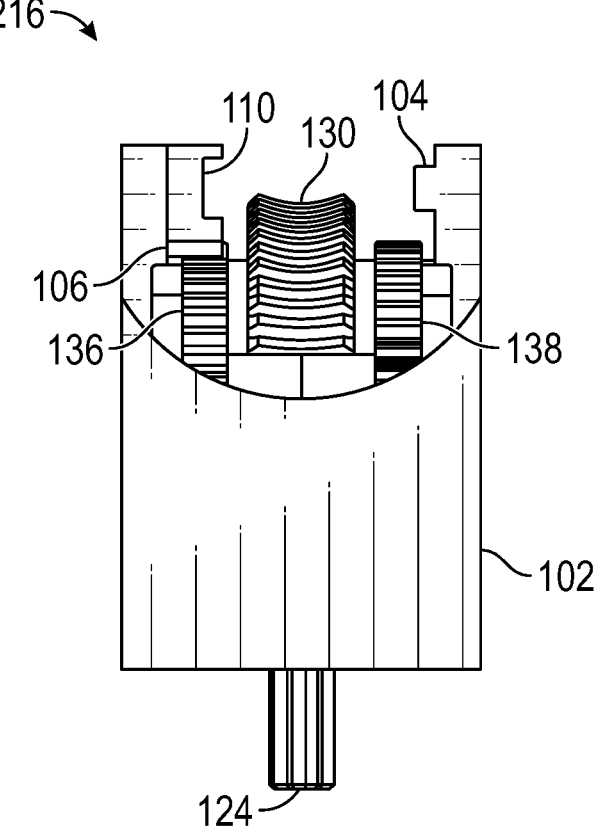
FIG. 15 is a front view of the drive mechanism assembly of FIG. 13.

The gearbox assembly 108 comprises a carriage 118 which traverses the casing 102 along the first rack gear 106, a driven gear train 120 retained within the carriage 118, and a driver gear assembly 122 coupled to the carriage 118. The driver gear assembly 122 preferably comprises a drive shaft 124 and a driver gear, which is preferably a worm 126 as shown in FIG. 3. The drive shaft 124 is adapted to couple to an external rotary driver (not shown), such as a motor.

The driven gear train 120 comprises a plurality of gears arranged on one or more gear shafts. Preferably, the plurality of gears comprises a worm gear 130 and a first pinion gear 132 arranged on a first shaft 134, and a first spur gear 136 and second pinion gear 138 arranged on a second shaft 140, such that the worm 126 of the driver gear assembly 122 meshes with the worm gear 130 and the first pinion gear 132 meshes with the first spur gear 136.

The first pinion gear 132 also meshes with the casing rack gear 106, while the second pinion gear 138 meshes with the beam rack gear 114. In this manner, when the worm 126 is rotated, the gearbox assembly 108 will translate longitudinally in the casing 102 as the first pinion gear 132 advances along the casing rack gear 106. Simultaneously, the second pinion gear 138 will drive the beam 112 on the beam rack gear 114, causing it to extend outwards from the casing 102. The total distance extended by the first end 116 of the beam 112 is equivalent to the distance the gearbox assembly 108 travels within the casing 102 plus the distance the beam 112 translates outward relative to the gearbox assembly 108, as can be seen best in FIGS. 6A to 6C.

The worm 126 is preferred as a driver gear over other types of gears for its speed reduction capabilities and because, due to friction between the worm 126 and worm gear 130, the worm gear 130 is not normally able to rotate the worm 126. In the context of the drive mechanism 100, this means the beam 112 normally only extends and retracts when the rotary driver rotates the drive shaft 124. The beam 112 will not normally retract under loading, as the reactionary forces developed by the load on the beam 112 will be resisted by the frictional forces between the worm 126 and worm gear 130.

The casing 102 remains stationary with respect to the other components of the drive mechanism 100, but need not be stationary itself. As will be seen in the preferred embodiment below, the casing 102 may be, for example, incorporated into handheld apparatus.

Figure 19A:
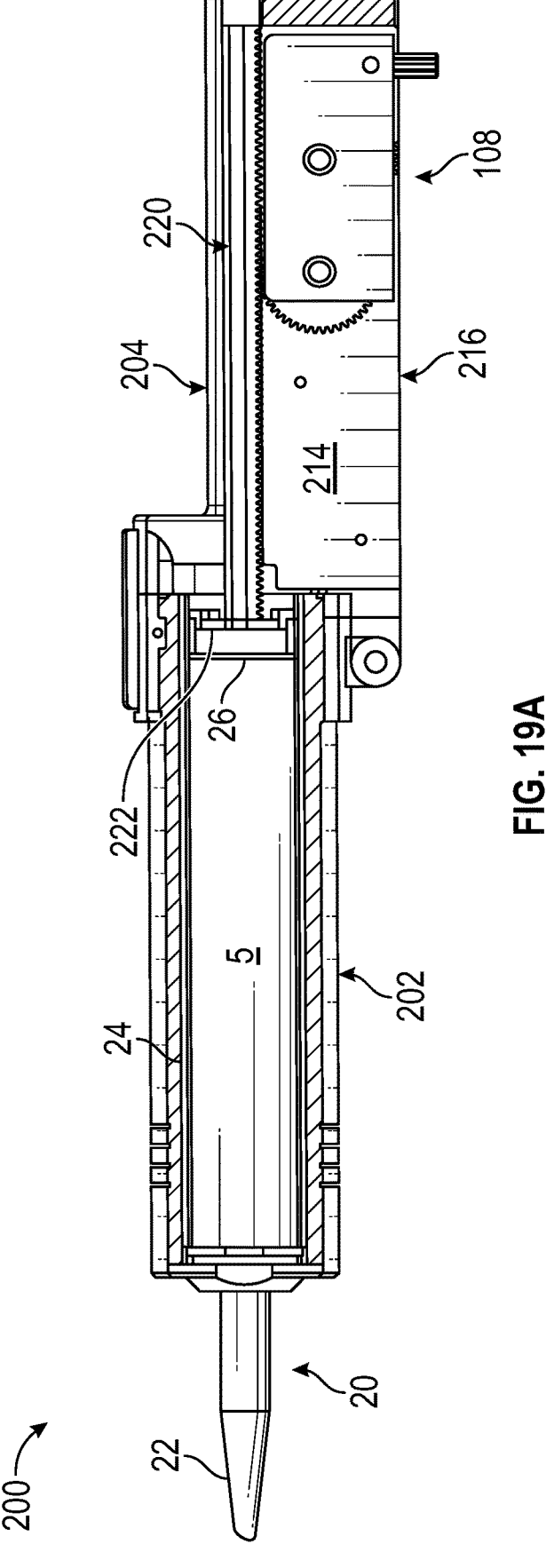
FIGS. 19A-19B are side section views of the viscous material dispenser of FIG. 7, taken along line 19-19 of FIG. 9 and with viscous material cartridge installed; showing the plunger ram retracted and extended into the viscous material chamber, respectively.
Figure 19B:
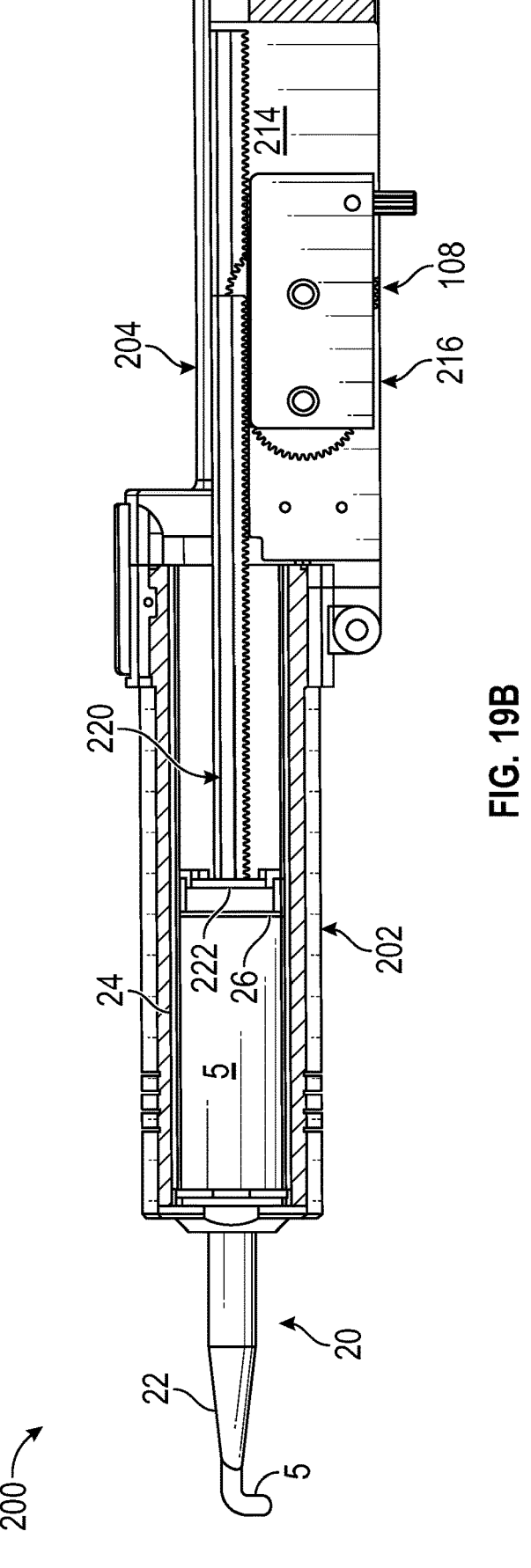

Referring to FIGS. 7 to 11, in the preferred embodiment of the invention a viscous material dispenser 200 comprises a viscous material chamber 202 and a drive mechanism section 204. Preferably, the viscous material chamber 202 is adapted to receive a standard viscous material cartridge 20, as seen in FIGS. 19A and 19B. Such cartridges 20 generally comprise an applicator tip 22, a cardboard or plastic tube 24 filled with a viscous material 5, such as a silicone sealant, an adhesive, or other similar compounds, and a movable disc seal 26 inside the tube 24. To accommodate a viscous material cartridge 20, the viscous material chamber 202 comprises a barrel 206 into which the tube 24 of the viscous material cartridge 20 is inserted, a dispenser port 208 through which the applicator tip 22 of a viscous material cartridge 20 may protrude, and, referring to FIGS. 19-21, a receiver port 210 which aligns with the disc seal 26.

Referring back to FIGS. 7 to 11, the drive mechanism section 204 comprises a drive housing 212 with an internal cavity 214, inside of which is mounted a drive mechanism assembly 216.

Referring to FIGS. 10 to 15, the drive mechanism assembly 216 comprises the casing 102, the gearbox assembly 108 retained within the casing 102, and a plunger ram 220 coupled to the casing. The casing 102 comprises the first tongue 104, the casing rack gear 106, and the first groove 110. The plunger ram 220 comprises the beam 112, beam rack gear 114, second tongue 113 and second groove 115.

Figure 16:
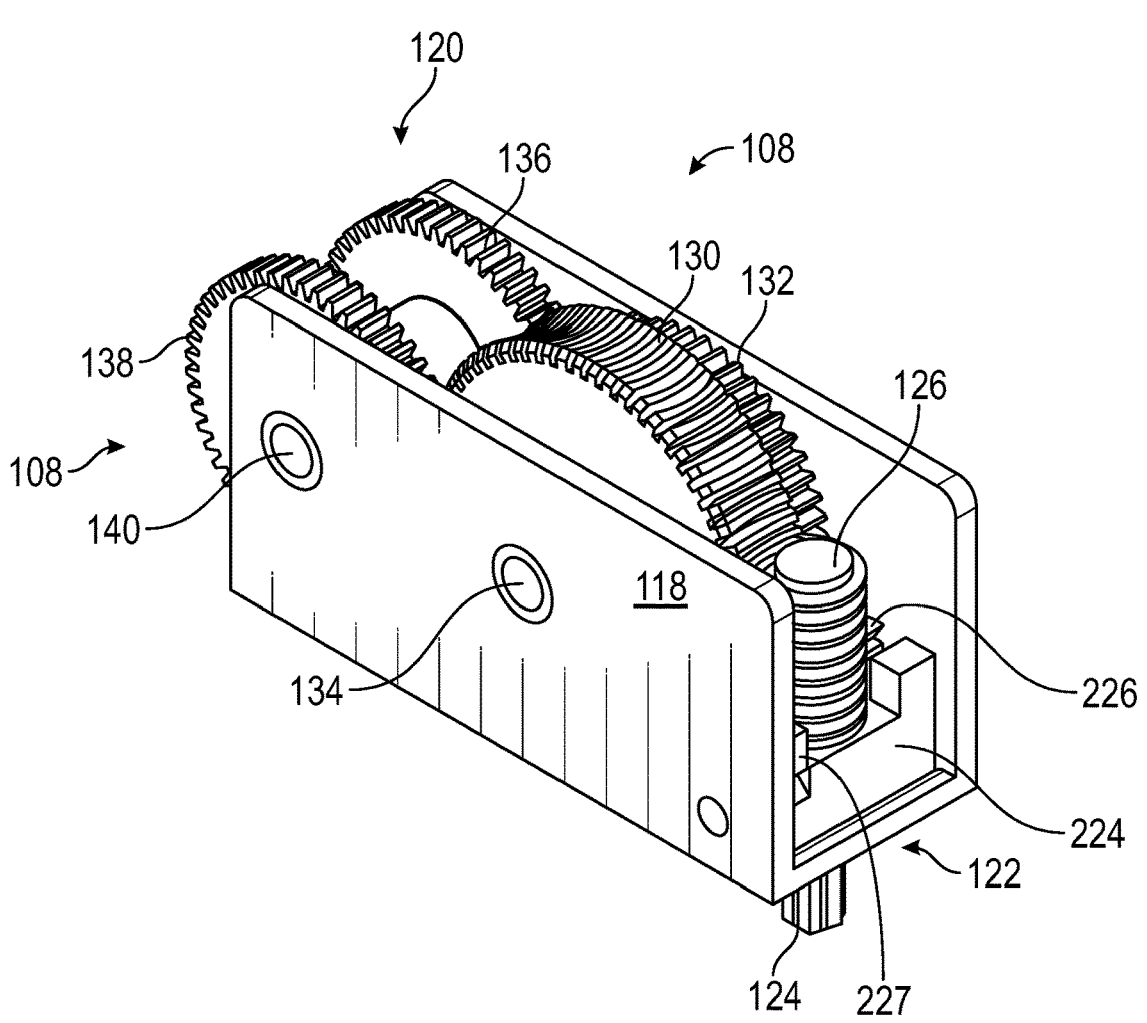
FIG. 16 is a perspective view of the gearbox carriage of the viscous material dispenser of FIG. 7.
Figure 17:
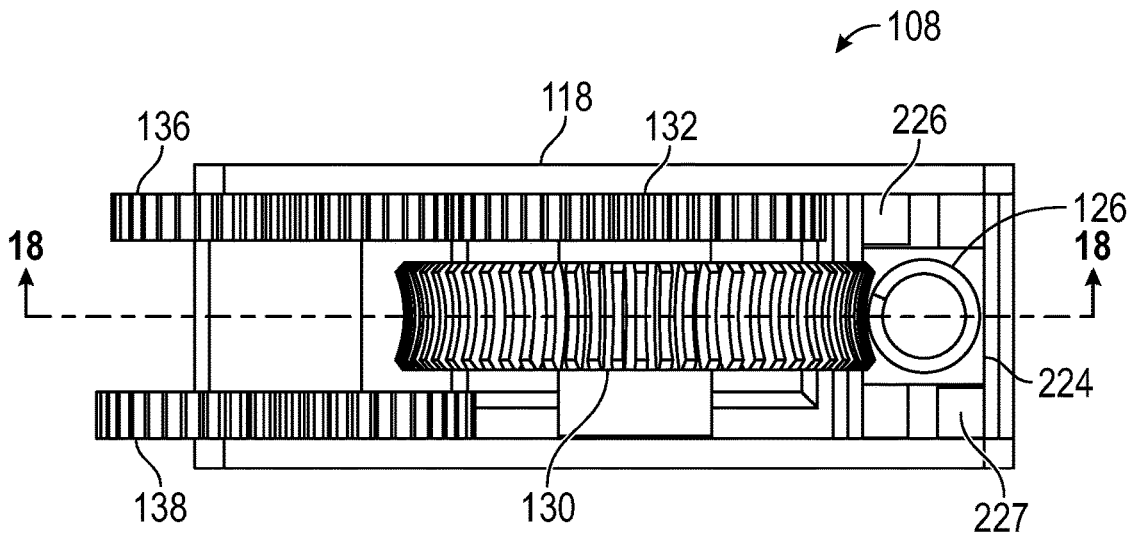
FIG. 17 is a top view of the gearbox carriage of FIG. 16.

Referring to FIGS. 16 and 17, the gearbox assembly 108 preferably comprises the carriage 118, first and second shafts 134, 140 mounted within the carriage 118, the worm gear 130 and first pinion gear 132 mounted to the first shaft 134, the first spur gear 136 and second pinion gear 138 mounted to the second shaft 140 so that the first spur gear 136 meshes with the first pinion gear 132, and the drive shaft 124 coupled to the carriage 118 with the worm 126 mounted to the drive shaft 124 and meshing with the worm gear 130. The drive shaft 124 is preferably a standard hex shape so that it may couple with a common handheld rotary drive source, such as an electric screwdriver (not shown).

Figure 18A:
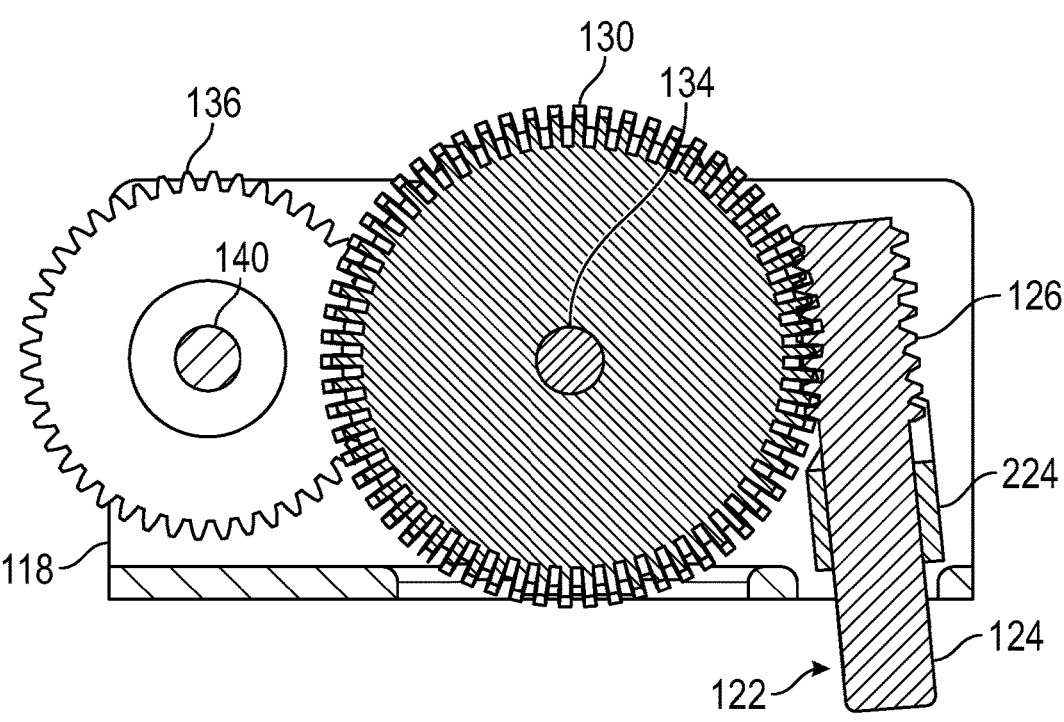
FIGS. 18A-18B are side section views of the gearbox carriage of FIG. 16, taken along section line 18-18 of FIG. 17, showing the driver gear pivotably engaged and disengaged with the driven gear train, respectively.
Figure 18B:
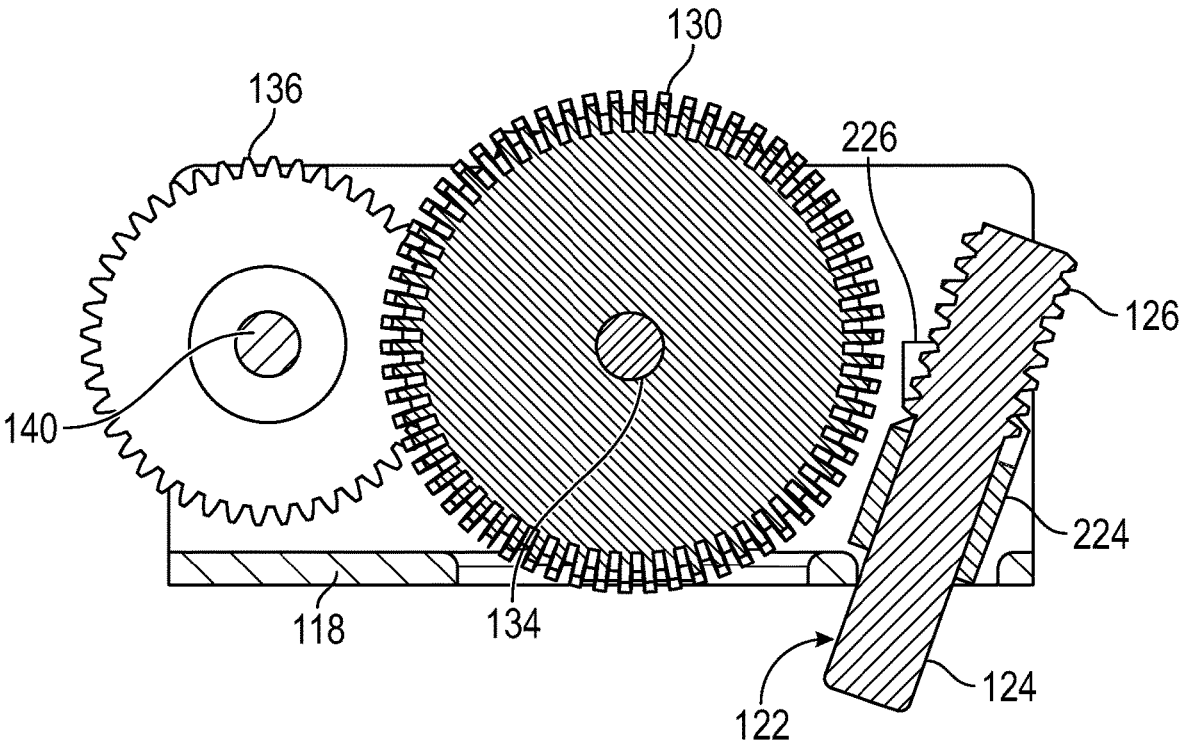

Referring to FIGS. 18A and 18B, the drive shaft 124 is preferably pivotably connected to the carriage 118 by a shaft mount 224. By pivoting drive shaft 124 on shaft mount 224, the worm 126 is brought into and out of engagement with the worm gear 130, as shown by FIG. 18A and FIG. 18B, respectively. The carriage 118 preferably further comprises a first pivot stop 226 which prevents the shaft mount 224 from pivoting too far towards the worm gear 130, thereby maintaining the necessary clearance between the worm 126 and worm gear 130 for proper functioning. The carriage 118 may optionally comprise a second pivot stop 227 to limit the disengagement distance of the worm 126.

Referring to FIGS. 19A and 19B, when the worm 126 is engaged with the worm gear 130, applying forward rotation to the drive shaft 124 using a rotary drive source will cause the gearbox assembly 108 to traverse the casing 102 on the casing rack gear 106 while simultaneously causing the plunger ram 220 to extend from the casing 102 and drive housing 212. Reversing the rotation of the drive shaft 124 simultaneously reverses the traversal direction of the gearbox assembly 108 and retracts the plunger ram 220. It can then be seen that the total distance traveled by the plunger face 222 is the sum of the distance traversed by the gearbox assembly 108 and the amount the plunger ram 220 is displaced on the beam rack gear 114 relative to the gearbox assembly 108. Accordingly, the overall length of the plunger ram 220 can be reduced by the available traversal length of the gearbox assembly 108 while still achieving the same stroke length as a conventional caulking gun. Disengaging the worm 126 from the worm gear 130 by pivoting the shaft mount 224 allows the first and second shafts 134, 140 to freely rotate, thereby allowing the plunger ram 220 to be rapidly extended or retracted by pushing forward or pulling back on the drive shaft 124, respectively.

Figure 20:
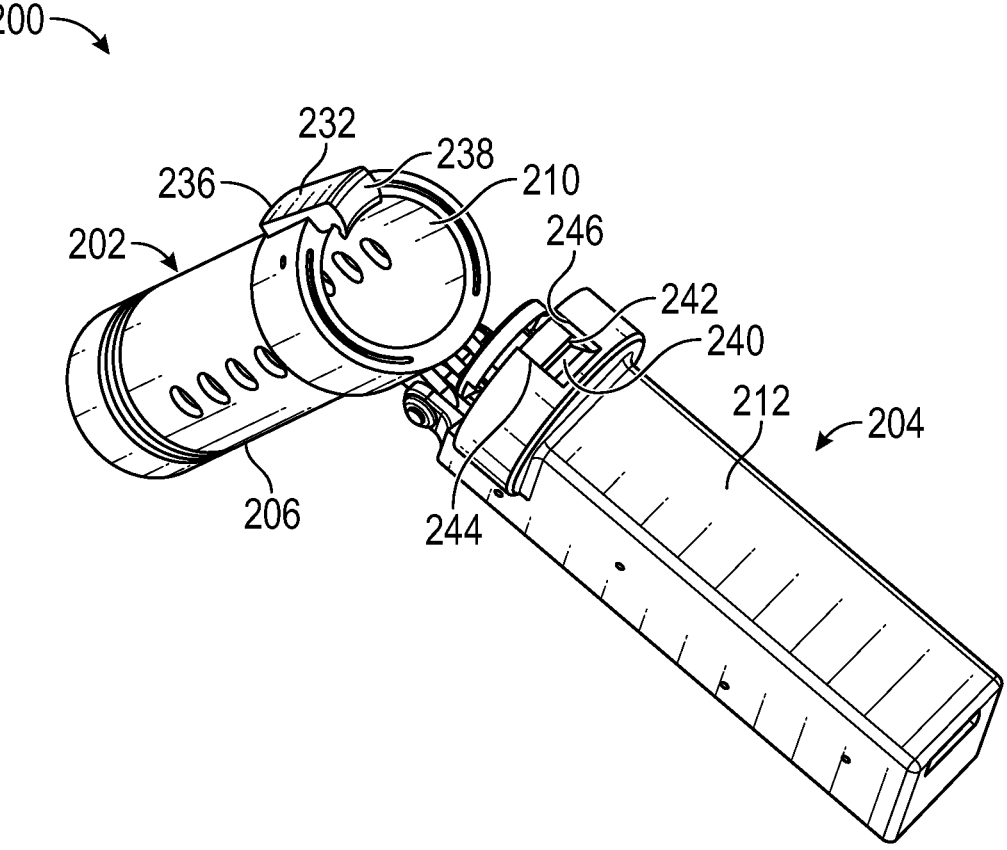
FIG. 20 is a perspective view of the viscous material dispenser of FIG. 7 with the viscous material chamber pivoted to the open position.

The plunger ram 220 extends into the viscous material chamber 202 through the receiver port 210 (which is best seen in FIG. 20). When a viscous material cartridge 20 is installed in the viscous material chamber 202 as described below, the plunger face 222 contacts the disc seal 26. Extending the plunger ram 220 further will therefore apply force to and move the disc seal 26, driving the viscous material 5 out of the applicator tip 22.

Referring to FIGS. 7, 8, 20 and 21, the viscous material chamber 202 is preferably connected to the drive mechanism section 204 by a hinge 228. When the viscous material chamber 202 is pivoted away from the drive mechanism section 204 to the open position shown in FIGS. 20 and 21, the viscous material cartridge 20 can be inserted into the barrel 206 through the now revealed receiver port 210. Pivoting the viscous material chamber 202 back into contact with the drive mechanism section 204 in the closed position shown in FIGS. 7 and 8 realigns the plunger ram 220 with the receiver port 210.

Figure 21:
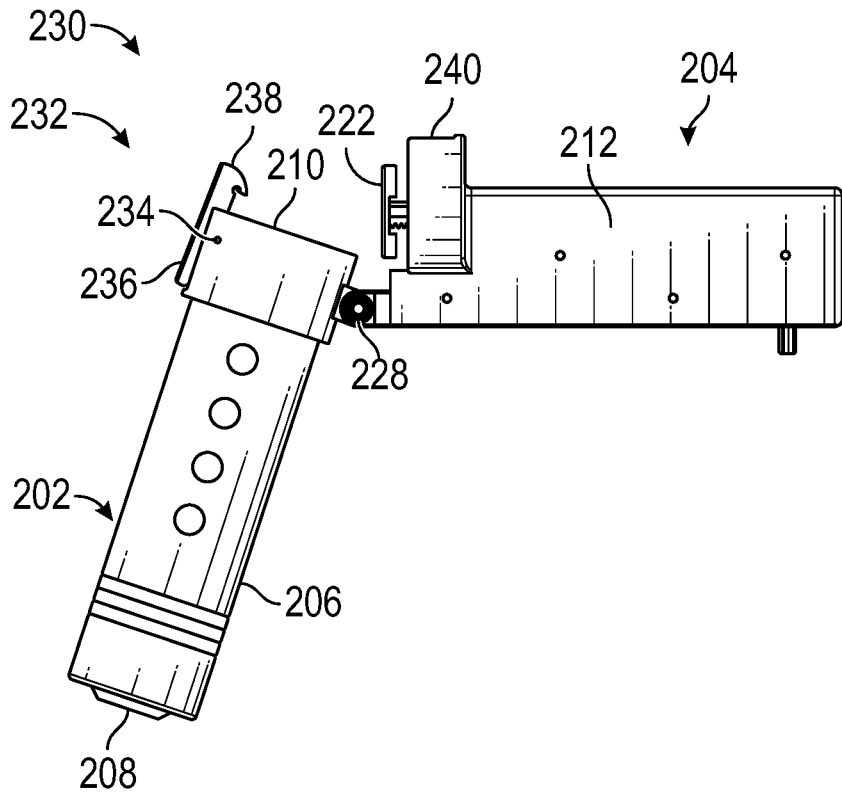
FIG. 21 is a side view of the viscous material dispenser of FIG. 20.

The viscous material dispenser 200 preferably further comprises a locking mechanism 230 to maintain the viscous material chamber 202 in contact with the drive mechanism section 204 against the reaction forces generated by dispensing the viscous material 5. The locking mechanism 230 preferably comprises a locking member 232 that is pivotally coupled to the viscous material chamber 202 by a lock hinge 234. The locking member 232 comprises a push tab 236 and hook 238 located on opposing sides of the lock hinge 234. The hook 238 engages with a retaining groove 240 on the drive housing 212. Applying force to the push tab 236 pivots the locking member 232 on the lock hinge 234, thereby disengaging the hook 238 from the retaining groove 240, which allows the viscous material chamber 202 to be pivoted away from the drive mechanism section 204 as shown in FIGS. 20 and 21. The push tab 236 is preferably spring loaded so that the hook 238 remains positively engaged with the retaining groove 240 while the viscous material dispenser 200 is closed until the push tab 236 is intentionally actuated. Spring loading the push tab 236 also causes the locking mechanism 230 to automatically engage when the viscous material dispenser 200 is closed: the drive housing 212 deflects the hook 238 upwards as the viscous material chamber 202 is pivoted towards the drive mechanism section 204, until the hook 238 is positioned over the retaining groove 240, at which point the deflecting force of the drive housing 212 is removed from the hook 238 and the spring loading automatically drives the hook 238 into the retaining groove 240. Spring loading may be accomplished by any manner known in the art, including but not limited to compression springs positioned between the push tab 236 and the viscous material chamber 202, and torsion springs on the lock hinge 238.

Figure 22:
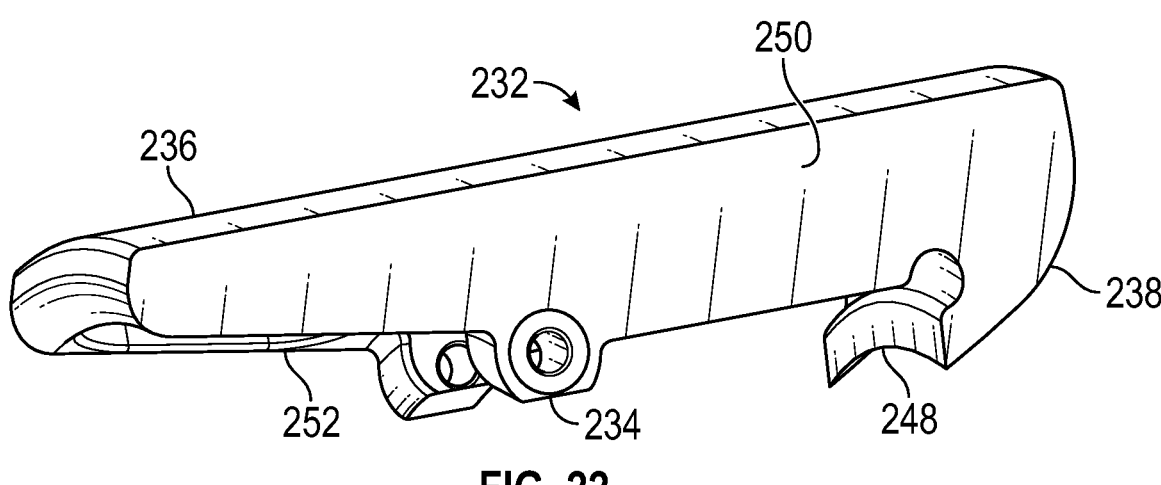
FIG. 22 is a perspective view of a locking member of the viscous material dispenser of FIG. 7.

Referring to FIGS. 20 to 22, geometric features of the hook 238 and retaining groove 240 provide enhanced locking features and resistance against the reaction forces of the viscous material tending to try to separate the viscous material chamber 202 from the drive mechanism section 204 while dispensing. A base 242 of the retaining groove 240 is preferably a circular arc, while groove sides 244, 246 are preferably substantially parallel. Likewise, a tip 248 of the hook 238 is preferably a circular arc, while hook sides 250, 252 are substantially parallel. These corresponding shapes result in a retaining groove 240 that is deeper at the edges than at the center, and a hook 238 that is longer at the edges than at the center, thereby better resisting reaction forces tending to twist or yaw the viscous material chamber 202 relative to the drive mechanism section 204. The hook 238 also preferably has a negative rake angle, which may be, for example, 5 degrees. The negative rake of the hook 238 causes the hook 238 to be pushed further into the retaining groove 240 when reaction forces generated by the dispensing the viscous material 5 attempt to separate the viscous material chamber 202 from the drive mechanism section 204. These features of the locking mechanism 230 contribute to a stronger, more rigid connection between the viscous material chamber 202 and drive mechanism section 204.

A method of operating the preferred embodiment will now be described. First, the worm 126 is pivoted away from the worm gear 130 and the plunger ram 220 is fully retracted by pulling back on the drive shaft 124 away from the viscous material chamber 202 along the casing 102. Next, the push tab 236 is depressed, allowing the viscous material chamber 202 to be pivoted away from the drive mechanism section 204. A viscous material cartridge 20 is loaded into the viscous material chamber, and the viscous material chamber is pivoted back until the hook 238 re-engages with the retaining groove 240. The applicator tip 22 of the viscous material cartridge 20 is pierced or cut to allow the viscous material 5 to exit the viscous material cartridge 20. The worm 126 is pivoted back into engagement with the worm gear 130 and the rotary drive source is driven in the forward direction to begin extending the plunger ram 220. The plunger face 222 applies force to disc seal 26, which in turn forces the viscous material 5 to flow out the hole made in the applicator tip 22.

When a desired bead of viscous material 5 has been dispensed, the rotary drive source is stopped. Certain viscous materials will continue to flow after the plunger ram 220 stops advancing unless the force applied by the plunger ram 220 is released. To do so, the worm 126 is again pivoted to disengage from the worm gear 130. This allows the driven gear train 120 to freely rotate, which allows the viscous material 5 to force the plunger ram 220 to retract slightly instead of continuing to flow from the applicator tip 22, thereby greatly reducing leakage. When another bead is ready to be started, the worm 126 is pivoted 20) back to engage with the worm gear 130 and the rotary drive source is again actuated in the forward direction.

In another embodiment the rotary drive source is permanently affixed to the drive shaft. In this embodiment, the rotary drive source comprises an electric motor housed within handle and connected to the drive shaft. The handle includes a trigger to actuate the electric motor. Power is supplied to the electric motor by cord, which can be connected to an external electricity source. Alternatively, a battery pack can be housed in or connected to the handle. In other embodiments, non-electric motors may be used. For example, the electric motor and cord could instead be a pneumatic motor and airline or hydraulic motor and fluid line.

In another embodiment, the viscous material dispenser is adapted to be used with bulk viscous material rather than a pre-packaged cartridge. The viscous material chamber is replaced by a fluid reservoir comprising a dispenser nozzle through which the fluid exits the fluid reservoir and a receiver port opposing the dispenser port and adapted to receive the plunger. The plunger face is replaced by a piston comprising piston rings to form a fluid-tight seal with an interior surface of the reservoir. The piston rings are necessary to prevent fluid from flowing past the piston and leaking out of the receiver port.

The dispenser nozzle preferably further comprises a sealing valve to prevent fluid from leaking out unless pressure is applied by the piston.

The reservoir may be breech loading as seen in the preferred embodiment. Alternatively, in another embodiment the reservoir is integral with the drive mechanism section. Fluid is introduced into the reservoir by drawing it through the dispenser nozzle under suction created by running the drive mechanism in reverse, similar to a syringe.

In other embodiments, the reservoir and seals may be made gas-tight, allowing the dispenser to dispense gases or aerosols.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A viscous material dispenser comprising:
a viscous material chamber;
a drive mechanism comprising:
    an elongate casing;
    a casing rack gear mounted to said elongate casing, said casing rack gear substantially parallel to a longitudinal axis of said elongate casing;
    a gearbox assembly retained by said elongate casing for traversing motion along the longitudinal axis of said elongate casing, said gearbox assembly comprising:
    a carriage;
    a driven gear train mounted to said carriage, said driven gear train meshing with said casing rack gear;
    a driver gear connected to said carriage and meshing with said driven gear train; and an extendable plunger ram retained by said elongate casing, said plunger ram comprising:
        a beam rack gear, said beam rack gear meshing with said driven gear train; and
        a plunger face mounted to a first end of said plunger ram,
    wherein rotation of said driver gear simultaneously causes said gearbox assembly to traverse said elongate casing along said casing rack gear and said plunger ram to extend into said viscous material chamber.

2. The viscous material dispenser of claim 1 wherein said driver gear is a worm.

3. The viscous material dispenser of claim 2 wherein said worm is mounted on a drive shaft.

4. The viscous material dispenser of claim 3 wherein said drive shaft is pivotably connected to said carriage so that said worm pivots into and out of engagement with said driven gear train.

5. The viscous material dispenser of claim 2, wherein said driven gear train comprises a worm gear meshing with said worm, a first pinion gear meshing with said casing rack gear, a second pinion gear meshing with said second rack gear, and at least one reducer gear interposed between said first pinion gear and said second pinion gear.

6. The viscous material dispenser of claim 1, said viscous material chamber further comprising a cavity adapted to receive a standard viscous material cartridge.

7. The viscous material dispenser of claim 1, wherein said viscous material chamber is pivotably connected to said drive mechanism section so as to allow said viscous material chamber to pivot between an open position away from said drive mechanism section for introduction of said viscous material into said viscous material chamber and a closed position wherein said plunger ram is aligned for extension into said viscous material chamber.

8. The viscous material dispenser of claim 7 further comprising a locking mechanism for maintaining said viscous material chamber in said closed position.

9. The viscous material dispenser of claim 8, said locking mechanism comprising a locking lever pivotably connected to said viscous material chamber and a retaining groove recessed in said drive mechanism section, said locking lever comprising a locking hook adapted to engage with said retaining groove and an opposing push tab for selectively pivoting said locking lever such that said locking hook disengages from said retaining groove.

10. The viscous material dispenser of claim 9, wherein said push tab is spring loaded to cause said locking hook to automatically engage with said retaining groove when said viscous material chamber is moved to said closed position.

11. The viscous material dispenser of claim 9, wherein a base of said engagement groove and a tip of said locking hook are mutually arcuate.

12. A method for dispensing a viscous material comprising:
providing a viscous material dispenser comprising:
    a viscous material chamber, said viscous material chamber comprising a dispenser port;
    a drive mechanism comprising:
        an elongate casing;
        a casing rack gear mounted to said elongate casing, said casing rack gear substantially parallel to a longitudinal axis of said elongate casing;
        a gearbox assembly retained by said elongate casing for traversing motion along the longitudinal axis of said elongate casing, said gearbox assembly comprising:

a carriage;

a driven gear train mounted to said carriage, said driven gear train meshing with said casing rack gear;

a driver gear connected to said carriage and meshing with said driven gear train; and an extendable plunger ram retained by said elongate casing, said plunger ram comprising:

a beam rack gear, said beam rack gear meshing with said driven gear train; and a plunger face mounted to a first end of said plunger ram, wherein rotation of said driver gear simultaneously causes said gearbox assembly to traverse said elongate casing along said casing rack gear and said plunger ram to extend into said viscous material chamber;

introducing a viscous material into said viscous material chamber; and rotating said driver gear, thereby ejecting said viscous material through said dispenser port.

13. The method of claim 12, wherein the step of introducing a viscous material into said viscous material chamber comprises:

rotating said driver gear in a reverse direction to retract said plunger ram from said viscous material chamber; and delivering said viscous material into said viscous material chamber.

14. The method of claim 13, wherein said driver gear is pivotably connected to said carriage.

15. The method of claim 14 further comprising interrupting ejection of said viscous material by pivoting said driver gear to disengage said driver gear from said driven gear train.

16. The method of claim 15, wherein the step of introducing a viscous material into said viscous material chamber comprises:

pivoting said driver gear to disengage said driver gear from said driven gear train;

pulling said gearbox assembly back to retract said plunger ram from said viscous material chamber; and delivering said viscous material into said viscous material chamber.

17. The method of claim 13, wherein the step of delivering said viscous material into said viscous material chamber comprises inserting a standard viscous material cartridge into said viscous material chamber.

18. The method of claim 17, wherein said viscous material chamber is pivotably connected to said drive mechanism.

19. The method of claim 18, wherein the step of inserting a standard viscous material cartridge into said viscous material chamber comprises:

pivoting said viscous material chamber away from said drive; and inserting said standard viscous material cartridge into an open end of said viscous material chamber.

20. A viscous material dispenser comprising:

a drive mechanism section comprising:

an elongate casing;

a first rack gear mounted inside said elongate casing and aligned with a longitudinal axis of said elongate casing;

a gearbox assembly retained within said elongate casing for traversing motion along said longitudinal axis of said elongate casing, said gearbox assembly comprising:

a carriage;

a drive shaft connected to said carriage, said drive shaft adapted to be coupled to a rotary drive source;

a driver gear mounted to said drive shaft; and a driven gear train mounted on said carriage and meshing with said driver gear and said first rack gear so that said gearbox assembly moves along said elongate casing in a first direction in response to clockwise rotational motion of said rotary drive source and moves along said elongate casing in a second direction in response to counterclockwise rotational motion of said rotary drive source;

a plunger ram slidably retained by said elongate casing for extending motion relative to said elongate casing, said plunger ram comprising:

a plunger face mounted to a first end of said plunger ram; and a second rack gear meshing with said driven gear train of said gearbox assembly so that said plunger ram extends and retracts in response to alternating directions of rotational motion of said rotary drive source concurrently with the movement in said first direction and said second direction of said gearbox carriage; and a viscous material chamber connected to said drive mechanism section, said viscous material section comprising:

a receiver port into which said plunger ram extends to act upon a viscous material; and a dispensing port through which said viscous material exits said viscous material chamber when acted upon by said plunger ram.

* * * * *